(12) United States Patent
Kulprathipanja et al.

(10) Patent No.: US 10,166,519 B2
(45) Date of Patent: Jan. 1, 2019

(54) METHODS AND FUEL PROCESSING APPARATUSES FOR UPGRADING A PYROLYSIS OIL STREAM AND A HYDROCARBON STREAM

(75) Inventors: Sathit Kulprathipanja, Schaumburg, IL (US); Paolo Palmas, Des Plaines, IL (US); Lance Awender Baird, Prospect Heights, IL (US)

(73) Assignee: UOP LLC, Des Plaines, IL (US)

( * ) Notice: Subject to any disclaimer, the term of this patent is extended or adjusted under 35 U.S.C. 154(b) by 1201 days.

(21) Appl. No.: 13/563,125

(22) Filed: Jul. 31, 2012

(65) Prior Publication Data
US 2014/0034554 A1    Feb. 6, 2014

(51) Int. Cl.
| | |
|---|---|
| C10G 11/00 | (2006.01) |
| B01J 8/26 | (2006.01) |
| C10G 11/18 | (2006.01) |
| C10G 75/00 | (2006.01) |
| F16L 101/12 | (2006.01) |

(52) U.S. Cl.
CPC .............. B01J 8/26 (2013.01); C10G 11/18 (2013.01); C10G 75/00 (2013.01); B01J 2208/00902 (2013.01); B01J 2219/30223 (2013.01); B01J 2219/30242 (2013.01); B01J 2219/30408 (2013.01); C10G 2300/1011 (2013.01); F16L 2101/12 (2013.01); Y02P 30/20 (2015.11)

(58) Field of Classification Search
CPC ......... C10G 11/00–11/22; C10G 75/00; C10G 75/02; C10G 75/04
USPC ................. 208/48 R, 106, 113; 585/240
See application file for complete search history.

(56) References Cited

U.S. PATENT DOCUMENTS

| | | | | |
|---|---|---|---|---|
| 2,326,525 A | * | 8/1943 | Diwoky ............... | C10B 33/006 134/177 |
| 2,590,219 A | * | 3/1952 | Stephanoff ............ | B01J 8/18 208/152 |

(Continued)

FOREIGN PATENT DOCUMENTS

| | | |
|---|---|---|
| RU | 2343336 C2 | 1/2009 |
| RU | 2010107891 A | 9/2011 |

(Continued)

OTHER PUBLICATIONS

Schuurman, et al., "Co-processing in FCC Units: Catalytic Co-Cracking of Hydrocarbons and Oxygenated Biomass Compounds," ACS National Meeting Book of Abstracts, Aug. 19-23, 2007.

(Continued)

Primary Examiner — Michelle Stein (57) ABSTRACT

Methods and apparatuses for upgrading a pyrolysis oil stream and a hydrocarbon stream are provided. In an embodiment, a method for upgrading a pyrolysis oil stream and a hydrocarbon stream includes providing the pyrolysis oil stream and providing the hydrocarbon stream separate from the pyrolysis oil stream. The pyrolysis oil stream and the hydrocarbon stream are introduced into a reaction zone. Deposits form adjacent to a pyrolysis oil outlet of the pyrolysis oil stream. The pyrolysis oil stream and the hydrocarbon stream are catalytically cracked in the presence of a particulate cracking catalyst in the reaction zone. During catalytic cracking, the pyrolysis oil deposits adjacent the pyrolysis oil outlet of the pyrolysis oil stream are removed, such as with a cleaning head.

12 Claims, 4 Drawing Sheets

(56) References Cited

U.S. PATENT DOCUMENTS

| | | | |
|---|---|---|---|
| 5,188,805 A * | 2/1993 | Sabottke | 208/113 |
| 8,022,259 B2 | 9/2011 | Bauer et al. | |
| 8,097,090 B2 | 1/2012 | Freel et al. | |
| 2009/0139851 A1* | 6/2009 | Freel | C10B 49/22 201/23 |
| 2009/0266380 A1* | 10/2009 | Freel | B08B 9/00 134/8 |
| 2010/0222620 A1 | 9/2010 | O'Connor et al. | |
| 2010/0236915 A1 | 9/2010 | Freel et al. | |
| 2011/0094147 A1 | 4/2011 | Bartek et al. | |
| 2012/0138698 A1* | 6/2012 | Wilson et al. | 239/1 |
| 2012/0216448 A1* | 8/2012 | Ramirez Corredores et al. | 44/307 |

FOREIGN PATENT DOCUMENTS

| | | |
|---|---|---|
| WO | 2000065269 A1 | 11/2000 |
| WO | 2011053166 A1 | 5/2011 |

OTHER PUBLICATIONS

Corma, et al., "Processing Biomass-Derived Oxygenates in the Oil Refinery: Catalytic Cracking (Fcc) Reaction Pathways and Role of Catalyst," Journal of Catalysis, v 247, n 2, p. 307-327, Apr. 25, 2007.

Marker, Terry, et al., "Opportunities for Biorenewables in Oil Refineries Final Technical Report," Submitted to: U.S. Department of Energy, Publication Date: Dec. 12, 2005.

International Search Report for PCT/US2013/040851, dated Nov. 14, 2013.

* cited by examiner

METHODS AND FUEL PROCESSING APPARATUSES FOR UPGRADING A PYROLYSIS OIL STREAM AND A HYDROCARBON STREAM

TECHNICAL FIELD

The technical field generally relates to methods and fuel processing apparatuses for upgrading a pyrolysis oil stream and a hydrocarbon stream. More particularly, the technical field relates to methods and fuel processing apparatuses for catalytically cracking a pyrolysis oil stream and a hydrocarbon stream in a reaction zone.

BACKGROUND

Fluid catalytic cracking (FCC) is a well-known process for the conversion of relatively high boiling point hydrocarbons to lower boiling point hydrocarbons in the heating oil or gasoline range. Such processes are commonly referred to in the art as "upgrading" processes. To conduct FCC processes, FCC units are generally provided that have one or more reaction zones, with a hydrocarbon stream contacted in the one or more reaction zones with a particulate cracking catalyst. The particulate cracking catalyst is maintained in a fluidized state under conditions that are suitable for the conversion of the relatively high boiling point hydrocarbons to lower boiling point hydrocarbons.

While hydrocarbon streams such as vacuum gas oil, reduced crude, or other petroleum-based sources of hydrocarbons have commonly been upgraded through FCC processes, there is a general desire to upgrade biofuels along with the hydrocarbon streams in the FCC processes. By upgrading biofuel along with the hydrocarbon streams, the resulting upgraded fuel includes a renewable content and enables net petroleum-based hydrocarbon content of the upgraded fuel to be decreased.

Biofuels encompass various types of combustible fuels that are derived from organic biomass, and one particular type of biofuel is pyrolysis oil, which is also commonly referred to as biomass-derived pyrolysis oil. Pyrolysis oil is produced through pyrolysis, including through recently-developed fast pyrolysis processes. Fast pyrolysis is a process during which organic biomass, such as wood waste, agricultural waste, etc., is rapidly heated to about 450° C. to about 600° C. in the absence of air using a pyrolysis unit. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system to produce a pyrolysis oil stream. Pyrolysis oil is a complex, highly oxygenated organic liquid that typically contains about 20-30% by weight water with high acidity (TAN>150).

Due to the high oxygen content of the pyrolysis oils, pyrolysis oils are generally immiscible with hydrocarbon streams. Prior attempts to co-process pyrolysis oil streams and hydrocarbon streams have involved deoxygenation of the pyrolysis oil followed by combining the deoxygenated pyrolysis oil stream and the hydrocarbon stream prior to FCC processing. Such approaches add unit operations, along with added capital costs, to the upgrading process. Further, clogging of feed lines may still remain a concern even after deoxygenating the pyrolysis oils, and feed lines that facilitate introduction of a pyrolysis oil stream into a reaction zone where FCC processing is conducted are prone to clogging. Additionally, feed lines that contain mixtures of a hydrocarbon stream and a pyrolysis oil stream are also generally prone to clogging due to the presence of the pyrolysis oil stream in the feed lines. Simply separating and introducing the hydrocarbon stream and the pyrolysis oil stream into the reaction zone through separate feed lines is ineffective to avoid clogging.

Accordingly, it is desirable to provide methods and apparatuses that enable a mixture of a pyrolysis oil stream and a hydrocarbon stream to be upgraded through catalytic cracking, such as in FCC units, while avoiding shutdown of the FCC units for cleaning due to clogging of feed lines. Furthermore, other desirable features and characteristics of the present invention will become apparent from the subsequent detailed description of the invention and the appended claims, taken in conjunction with the accompanying drawings and this background of the invention.

BRIEF SUMMARY

Methods and apparatuses for upgrading a pyrolysis oil stream and a hydrocarbon stream are provided. In an embodiment, a method for upgrading a pyrolysis oil stream and a hydrocarbon stream includes providing the pyrolysis oil stream and providing the hydrocarbon stream separate from the pyrolysis oil stream. The pyrolysis oil stream and the hydrocarbon stream are introduced into a reaction zone. Deposits form adjacent to a pyrolysis oil outlet of the pyrolysis oil stream. The pyrolysis oil stream and the hydrocarbon stream are catalytically cracked in the presence of a particulate cracking catalyst in the reaction zone. During catalytic cracking, the pyrolysis oil deposits adjacent the pyrolysis oil outlet of the pyrolysis oil stream are removed.

In another embodiment, a method of upgrading a pyrolysis oil stream and a hydrocarbon stream is conducted in a fluid catalytic cracking unit including a reaction zone. The method includes providing the pyrolysis oil stream through a pyrolysis oil feed line and the hydrocarbon stream through a hydrocarbon feed line separate from the pyrolysis oil feed line. The pyrolysis oil feed line includes a pyrolysis oil outlet, and pyrolysis oil deposits form in the pyrolysis oil feed line adjacent the pyrolysis oil outlet. The pyrolysis oil stream is introduced from the pyrolysis oil feed line and the hydrocarbon stream is introduced from the hydrocarbon feed line into the reaction zone. The pyrolysis oil stream and the hydrocarbon stream are catalytically cracked in the presence of a particulate cracking catalyst in the reaction zone. During catalytic cracking, the pyrolysis oil deposits in the pyrolysis oil feed line adjacent the pyrolysis oil outlet are removed with a cleaning head that is disposed in the pyrolysis oil feed line.

In another embodiment, a fuel processing apparatus includes a fluid catalytic cracking unit. The fluid catalytic cracking unit includes a reaction zone, a pyrolysis oil feed line, a hydrocarbon feed line, and a cleaning head. Particulate cracking catalyst is contacted with a mixture of a hydrocarbon stream and a pyrolysis oil stream in the reaction zone. The pyrolysis oil feed line has a pyrolysis oil outlet, and the hydrocarbon feed line has a hydrocarbon outlet. The hydrocarbon feed line is separate from the pyrolysis oil feed line. The cleaning head is disposed within the pyrolysis oil feed line and is movable in upstream and downstream directions within the pyrolysis oil feed line.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Methods and fuel processing apparatuses for upgrading a pyrolysis oil stream and a hydrocarbon stream are provided herein. As referred to herein, "upgrading" refers to conversion of relatively high boiling point hydrocarbons to lower boiling point hydrocarbons. Upgrading processes generally render the hydrocarbon stream and the pyrolysis oil stream suitable for use as a transportation fuel. In the methods and fuel processing apparatuses described herein, the pyrolysis oil stream and the hydrocarbon stream are catalytically cracked in the presence of a particulate cracking catalyst in a reaction zone. The reaction zone, as referred to herein, is an area or space where particulate cracking catalyst is comingled along with the pyrolysis oil stream and/or the hydrocarbon stream. Catalytic cracking is conducted at temperatures in excess of 100° C., and the hydrocarbon stream is generally provided at temperatures in excess of 100° C. However, pyrolysis oil generally polymerizes at temperatures in excess of about 100° C. and forms pyrolysis oil deposits within the apparatuses. Deposit formation is less of a concern in the reaction zone than in feed lines that lead to the reaction zone. In particular, deposit formation in the reaction zone generally results in deposited compounds forming on the particulate cracking catalyst. The deposited compounds formed on the particulate cracking catalyst may originate from the pyrolysis oil stream and/or the hydrocarbon stream. Because the particulate cracking catalyst may be regenerated through conventional processes even with high amounts of deposited compounds present thereon, operation of the fuel processing apparatuses is not materially affected by formation of deposited compounds on the particulate cracking catalyst. However, deposit formation in the feed lines that lead to the reaction zone may result in clogging, which requires shutdown of the fuel processing apparatuses and cleanout of the clogged feed lines. Therefore, to avoid shutdown of the fuel processing apparatuses due to deposit formation attributable to polymerization within the pyrolysis oil stream in the feed lines that lead to the reaction zone, the methods and fuel processing apparatuses that are described herein are adapted to remove pyrolysis oil deposits adjacent to a pyrolysis oil outlet of the pyrolysis oil stream during catalytic cracking, thereby enabling the fuel processing apparatuses to continue operation. By "remove pyrolysis oil deposits adjacent to a pyrolysis oil outlet of the pyrolysis oil stream", it is meant that pyrolysis oil deposits are removed in a pyrolysis oil feed line up to and at a pyrolysis oil outlet of the pyrolysis oil feed line, and may additionally be removed at locations that are adjacent to the pyrolysis oil outlet of the pyrolysis oil feed line but outside of the pyrolysis oil feed line such as, for example, at a mixing zone outlet that is located outside of the pyrolysis oil feed line and adjacent to the pyrolysis oil outlet of the pyrolysis oil feed line. The "pyrolysis oil outlet" refers to an outlet where the pyrolysis oil stream is either introduced into the reaction zone or is introduced into a mixing zone where the pyrolysis oil stream is mixed with the hydrocarbon stream prior to introducing the resulting mixture into the reaction zone.

To remove the pyrolysis oil deposits that are adjacent to the pyrolysis oil outlet of the pyrolysis oil feed line during catalytic cracking, in an embodiment, a cleaning head is disposed in the pyrolysis oil feed line and is movable in upstream and downstream directions within the pyrolysis oil feed line to clear pyrolysis oil deposits in the pyrolysis oil feed line. The cleaning head may also be shaped to clear pyrolysis oil deposits that are outside of the pyrolysis oil feed line, as described in further detail below, to effectively remove the pyrolysis oil deposits during catalytic cracking without requiring shutdown of the fuel processing apparatuses for cleaning.

Figure 1:
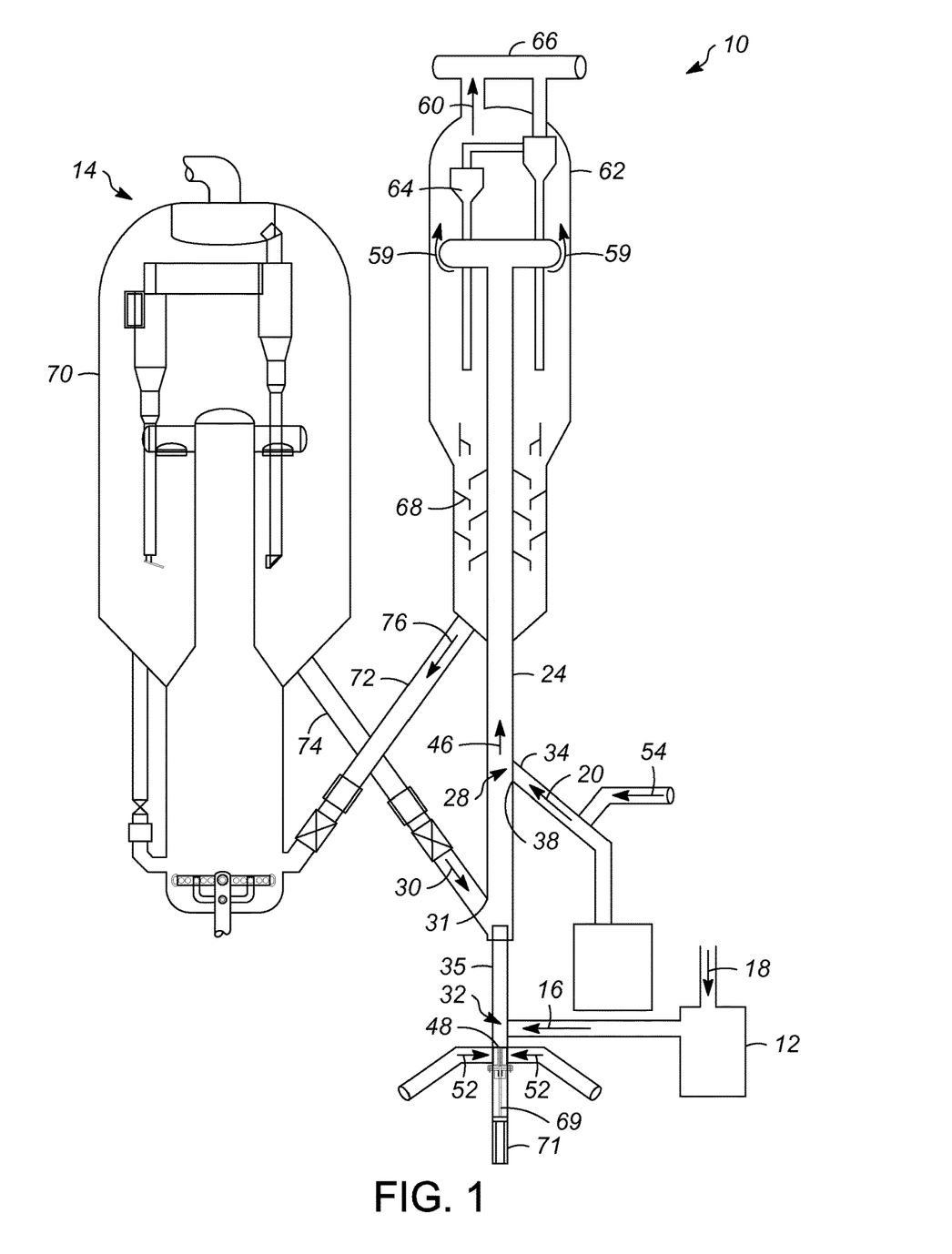
FIG. 1 is a schematic diagram of a fuel processing apparatus and a method for preparing upgraded pyrolysis oil in accordance with an exemplary embodiment.

An exemplary embodiment of a method for preparing upgraded pyrolysis oil will now be addressed with reference to an exemplary fuel processing apparatus 10 as shown in FIG. 1. In this embodiment, the fuel processing apparatus 10 includes a pyrolysis unit 12 and a fluid catalytic cracking (FCC) unit 14. The pyrolysis unit 12 provides a pyrolysis oil stream 16 by pyrolyzing a biomass stream 18 to produce the pyrolysis oil stream 16, such as through recently-developed fast pyrolysis. Fast pyrolysis is a process during which the biomass stream 18, such as wood waste, agricultural waste, biomass that is purposely grown and harvested for energy, and the like, is rapidly heated to about 450° C. to about 600° C. in the absence of air in the pyrolysis unit 12. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system within the pyrolysis unit 12 to produce the pyrolysis oil stream 16. The pyrolysis oil stream 16 is a complex, organic liquid having an oxygen content, and may also contain water. For example, the oxygen content of the pyrolysis oil stream 16 can be from about 30 to about 60 weight %, such as from about 40 to about 55 weight %, based on the total weight of the pyrolysis oil stream 16. Water can be present in the pyrolysis oil stream 16 in an amount of from about 10 to about 35 weight %, such as from about 20 to about 32 weight %, based on the total weight of the pyrolysis oil stream 16. It is to be appreciated that in other embodiments, although not shown, the pyrolysis oil stream 16 may be provided from any source of pyrolysis oil such as a vessel that contains the pyrolysis oil stream 16, and the methods described herein are not limited to providing the pyrolysis oil stream 16 from any particular source. In an embodiment, the pyrolysis oil stream 16 is provided from the pyrolysis unit 12 at a temperature of less than or equal to about 100° C., such as less than or equal to about 80° C., to minimize polymerization of the pyrolysis oil stream 16 that could lead to deposit formation after leaving the pyrolysis unit 12.

In accordance with the exemplary method contemplated herein, a hydrocarbon stream 20 is also provided. As referred to herein, "hydrocarbon stream" refers to a petroleum-based source of hydrocarbons. The hydrocarbon stream 20 is provided separate from the pyrolysis oil stream 16, with the pyrolysis oil stream 16 and hydrocarbon stream 20 separately introduced into a reaction zone 28 as described in further detail below. The hydrocarbon stream 20 can include a fresh stream of hydrocarbons, or can include a refined stream of hydrocarbons from other refinement operations. In an embodiment, the hydrocarbon stream 20 is vacuum gas oil, which is a common hydrocarbon stream 20 that is upgraded in FCC units. It is to be appreciated that the hydrocarbon stream 20 may be provided from any source, and the methods described herein are not limited to providing the hydrocarbon stream 20 from any particular source. In embodiments, the hydrocarbon stream 20 is provided at a temperature that is higher than the pyrolysis oil stream 16, and is further introduced into the reaction zone 28 at a temperature that is higher than the pyrolysis oil stream 16, because little risk of deposit formation from the hydrocarbon stream 20 exists due to elevated temperatures and because elevated temperatures of the hydrocarbon stream 20 promote catalytic cracking. In an embodiment, the hydrocarbon stream 20 is provided at a temperature of at least 100° C., such as from about 100 to about 425° C., for example from about 200 to about 300° C.

Figure 2:
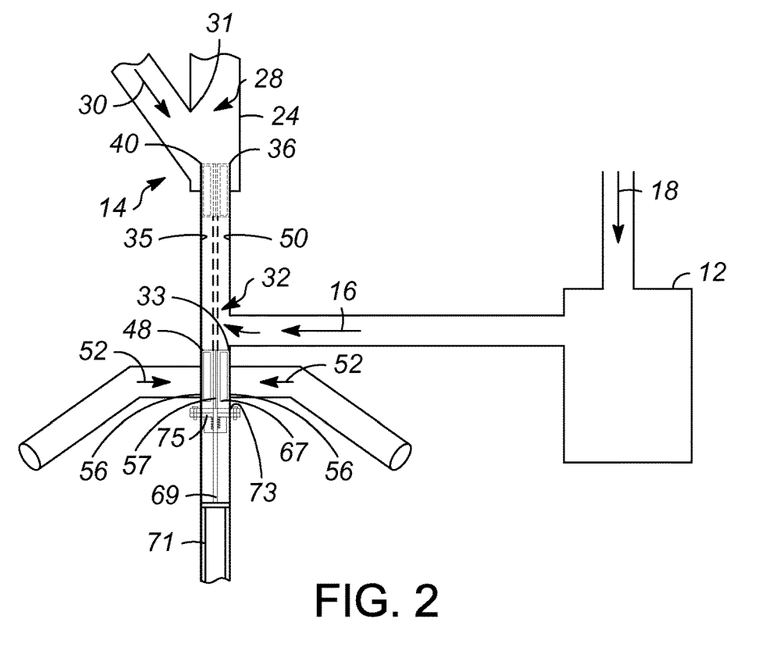
FIG. 2 is a partial schematic view of a portion of the fuel processing apparatus and the method of FIG. 1, showing an embodiment of a pyrolysis oil feed line in greater detail including a cleaning head disposed in the pyrolysis oil feed line for removing pyrolysis oil deposits in the pyrolysis oil feed line.

Referring to FIG. 1, an exemplary embodiment of the FCC unit 14 contemplated herein includes a reaction zone 28, a pyrolysis oil feed line 35, and a hydrocarbon feed line 34 that is separate from the pyrolysis oil feed line 35. In particular, a particulate cracking catalyst 30 is contacted with a mixture 46 of the hydrocarbon stream 20 and the pyrolysis oil stream 16 in the reaction zone 28 to catalytically crack the pyrolysis oil stream 16 and the hydrocarbon stream 20 in the presence of the particulate cracking catalyst 30. In an embodiment and as shown in FIG. 1, the pyrolysis oil feed line 35 has a pyrolysis oil outlet 36 into the reaction zone 28, and the pyrolysis oil stream 16 is provided through the pyrolysis oil feed line 35 and introduced into the reaction zone 28 through the pyrolysis oil outlet 36. In an embodiment and as shown in FIG. 2, the pyrolysis oil feed line 35 further includes a feed distribution tip 40 for spraying or atomizing the pyrolysis oil stream 16 into the reaction zone 28, and the pyrolysis oil outlet 36 is located at the feed distribution tip 40. Referring to FIGS. 1 and 2, the hydrocarbon feed line 34 has a hydrocarbon outlet 38 into the reaction zone 28 for introducing the hydrocarbon stream 20 into the reaction zone 28 separate from the pyrolysis oil stream 16. The exemplary method continues with separately introducing the pyrolysis oil stream 16 and the hydrocarbon stream 20 into the reaction zone 28 to form a mixture 46 of the pyrolysis oil stream 16 and the hydrocarbon stream 20 in the reaction zone 28.

Referring to FIG. 2, an exemplary embodiment of the FCC unit 14 further includes a carrier gas inlet 56 into the pyrolysis oil feed line 35 for mixing a carrier gas 52 with the pyrolysis oil stream 16 in an atomizing zone 32 within the pyrolysis oil feed line 35. The carrier gas 52 may be FCC product gas, steam, and/or or an inert gas such as nitrogen. The carrier gas 52 is mixed with the pyrolysis oil stream 16 to assist with introducing the pyrolysis oil stream 16 into the reaction zone 28. The carrier gas 52 is mixed with the pyrolysis oil stream 16 in the atomizing zone 32 prior to introducing the pyrolysis oil stream 16 into the reaction zone 28. In an embodiment and as shown in FIG. 2, the atomizing zone 32 is within the pyrolysis oil feed line 35 and the carrier gas inlet 56 is upstream of a pyrolysis oil inlet 33 into the pyrolysis oil feed line 35 with the atomizing zone 32 located downstream of the carrier gas inlet 56.

Due to high temperatures within the reaction zone 28, and because pyrolysis oil generally polymerizes at temperatures in excess of about 100° C., pyrolysis oil deposits form adjacent the pyrolysis oil outlet 36 of the pyrolysis oil stream 16 into the reaction zone 28 over time as the pyrolysis oil stream 16 is introduced into the reaction zone 28. In an embodiment and as shown in FIG. 2, where the pyrolysis oil feed line 35 includes the pyrolysis oil outlet 36 into the reaction zone 28, pyrolysis oil deposits form in the pyrolysis oil feed line 35 adjacent the pyrolysis oil outlet 36, and the pyrolysis oil deposits may form at any location between the pyrolysis oil inlet 33 into the pyrolysis oil feed line 35 and the pyrolysis oil outlet 36 of the pyrolysis oil feed line 35 into the reaction zone 28. In accordance with an exemplary method, pyrolysis oil deposits are removed adjacent the pyrolysis oil outlet 36 of the pyrolysis oil stream 16 during catalytic cracking. In an embodiment and as shown in FIG. 2, the FCC unit 14 includes a cleaning head 48 that is disposed within the pyrolysis oil feed line 35 and that is movable in upstream and downstream directions within the pyrolysis oil feed line 35, and the pyrolysis oil deposits in the pyrolysis oil feed line 35 adjacent the pyrolysis oil outlet 36 are removed with the cleaning head 48 that is disposed in the pyrolysis oil feed line 35. The cleaning head 48 may be any structure that is movable in the pyrolysis oil feed line 35 and that can remove the pyrolysis oil deposits.

Figure 3:
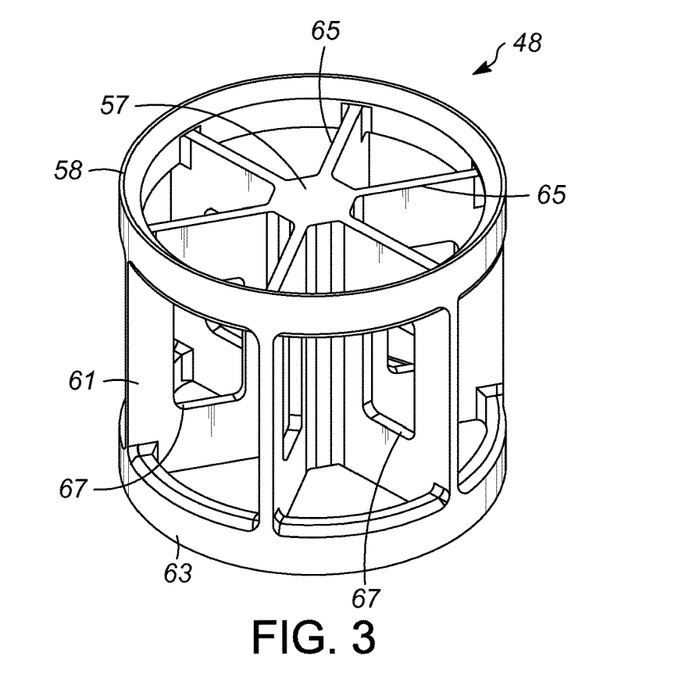
FIG. 3 is a perspective schematic view of the cleaning head shown in FIG. 2.

In an embodiment and as shown in FIG. 2, the cleaning head 48 has a shape that generally conforms to an inner surface 50 of the pyrolysis oil feed line 35 at the pyrolysis oil outlet 36 to enable removal of the pyrolysis oil deposits from the inner surface 50 of the pyrolysis oil feed line 35 at the pyrolysis oil outlet 36. Examples of suitable cleaning heads 48 include, but are not limited to, a reamer having a high pressure nozzle head that uses high-velocity gaseous, vapor or liquid jet or stream to remove the pyrolysis oil deposits; a rotating auger (e.g., a helical shaft); a wire brush head that scours with inner surface 50 of the pyrolysis oil feed line 35 and that is constructed of a high temperature, flexible abrasive resistant material such as stainless steel; or a ram head. Referring to FIG. 3, an embodiment of the cleaning head 48 is shown as a ram head 48 that is generally cylindrical with a beveled front edge 58 to break the pyrolysis oil deposits. Referring to FIG. 3, in an embodiment, the cleaning head 48 has a central hub 57 with a plurality of radial spokes 61 extending between the central hub 57 and the beveled front edge 58, and the cleaning head 48 may also have a trailing ring 63 to stabilize the radial spokes 61. In an embodiment, openings 65 are defined between adjacent radial spokes 61, and the radial spokes 61 define cutouts 67 therein. While it is to be appreciated that specific materials for the cleaning head 48 are not particularly limited, in an embodiment, the cleaning head 48 is formed from a robust high strength material such as, but not limited to, stainless steel alloys. In an embodiment where the cleaning head 48 is the ram head 48 as shown in FIG. 3, areas of the ram head 48 subjected to wear are made of a high strength alloy and/or treated by hard surfacing. For example, a tungsten-carbide hard surface may be applied to the ram head 48.

A clearance between the ram head 48 and the inner surface 50 of the pyrolysis oil feed line 35 may be from about 0.3 to about 1.25 cm, and such as about 0.6 cm. The clearance should be small to clear as much of the cross-sectional area of the pyrolysis oil feed line 35 as possible, but not so small that the ram head 48 impacts the inner surface 50 of the pyrolysis oil feed line 35.

In an embodiment and as shown in FIG. 2, a shaft 69 is connected to the cleaning head 48 and is adapted to move the cleaning head 48 within the pyrolysis oil feed line 35 between a position upstream of the atomizing zone 32 in the pyrolysis oil feed line 35 and a position downstream of the atomizing zone 32 in the pyrolysis oil feed line 35. The shaft 69 may be connected to the cleaning head 48 at the central hub 57 thereof on one end of the shaft 69. The shaft 69 is connected, on an end of the shaft 69 opposite the cleaning head 48, to an actuator 71 for moving the shaft 69 and the cleaning head 48 between the position upstream of the atomizing zone 32 and the position downstream of the atomizing zone 32. Exemplary actuators include, but are not limited to, rack and pinion, hydraulic, or pneumatic actuators. As shown in FIG. 2, the actuator 71 and shaft 69 are positioned to move the cleaning head 48 linearly within the pyrolysis oil feed line 35, and the pyrolysis oil feed line 35 may have a closed end 73 adjacent the carrier gas inlet 56. The shaft 69 passes through the closed end 73 and the closed end 73 is sealed around the shaft 69. The actuator 71 may be mounted on a bracket 75 that is bolted to the closed end 73 of the pyrolysis oil feed line 35. In a stored position, the cleaning head 48 is positioned behind the pyrolysis oil inlet 33 into the pyrolysis oil feed line 35 to facilitate the flow of pyrolysis oil stream 16 through the pyrolysis oil feed line 35 when the cleaning head 48 is not in use.

In an embodiment and as shown in FIG. 2, to remove the pyrolysis oil deposits adjacent the pyrolysis oil outlet 36 of the pyrolysis oil stream 16 into the reaction zone 28, the cleaning head 48 is moved in upstream and downstream directions within the pyrolysis oil feed line 35. In an embodiment, the pyrolysis oil deposits are removed downstream of the atomizing zone 32 in the pyrolysis oil feed line 35, and the cleaning head 48 is moved within the pyrolysis oil feed line 35 between a position upstream of the atomizing zone 32 and a position downstream of the atomizing zone 32. In an embodiment, the cleaning head 48 is passed through the pyrolysis oil outlet 36, and the cleaning head 48 can further serve to remove pyrolysis oil deposits that are formed outside of the pyrolysis oil outlet 36 but that are in the path of the cleaning head 48 toward the reaction zone 28. In this embodiment, the cleaning head 48 is stored adjacent the carrier gas inlet 56 into the pyrolysis oil feed line 35, with the cleaning head 48 moved from the stored position when cleaning is desired. Referring to FIG. 3, in an embodiment where the cleaning head 48 is the ram head 48, the openings 65 and cutouts 67 allow the carrier gas 52 to pass through the cleaning head 48 when the cleaning head 48 is disposed adjacent the carrier gas inlet 56, thereby avoiding a material impact on flow of the carrier gas 52 when the cleaning head 48 is stored adjacent the carrier gas inlet 56 and avoiding unwanted increases in system back pressure. The pyrolysis oil stream 16 can also pass through the openings 65 and the cutouts 67 while the cleaning head 48 is in use, as the cleaning head 48 is moved between the position upstream of the atomizing zone 32 and the position downstream of the atomizing zone 32.

Although not shown, a control system for the cleaning head 48 may be employed to periodically remove the pyrolysis oil deposits using the cleaning head 48. In an embodiment, the control system is configured to activate the cleaning head 48 when the pyrolysis oil deposits in the pyrolysis oil feed line 35 impede the flow of the pyrolysis oil stream 16 by a predetermined amount. In an exemplary embodiment, pressure sensors (not shown) may be employed to provide pressure readings that indicate excessive formation of the pyrolysis oil deposits in the pyrolysis oil feed line 35, thereby causing blockage of the pyrolysis oil feed line 35 and an increase in pressure therein. When a measured pressure exceeds a predetermined value that is indicative of excessive formation of the pyrolysis oil deposits in the pyrolysis oil feed line 35, the control system activates the cleaning head 48 to remove the pyrolysis oil deposits in the pyrolysis oil feed line 35 and adjacent the pyrolysis oil outlet 36. In an embodiment where the cleaning head 48 is the ram head 48 as shown in FIG. 3, the cleaning head 48 is moved in the pyrolysis oil feed line 35 while the pyrolysis oil stream 16 and carrier gas 52 flow through the pyrolysis oil feed line 35 and the openings 65 and cutouts 67 in the ram head 48, thereby allowing the FCC unit 14 to continue operation.

In an embodiment, to minimize deposit formation prior to introducing the pyrolysis oil stream 16 into the reaction zone 28, the pyrolysis oil stream 16 is maintained at a temperature below a temperature in the reaction zone 28 substantially up to introduction into the reaction zone. As referred to herein, "substantially up to" refers to a location in the pyrolysis oil feed line 35 that is adjacent to the pyrolysis oil outlet 36 into the reaction zone 28 but upstream of the pyrolysis oil outlet 36 within the pyrolysis oil feed line 35, such as a closest location in the pyrolysis oil feed line 35 to the pyrolysis oil outlet 36 where insulation or active external cooling of the pyrolysis oil feed line 35 can be implemented. Due to generally high temperatures in the reaction zone 28, as set forth in further detail below, temperature of the pyrolysis oil feed generally increases adjacent to the pyrolysis oil outlet 36 into the reaction zone 28 through influence of the temperature in the reaction zone 28. In an embodiment, the temperature of the pyrolysis oil stream 16 is maintained at less than or equal to about 100° C. substantially up to introduction into the reaction zone 28 to inhibit polymerization of the pyrolysis oil stream 16 that leads to formation of pyrolysis oil deposits.

The exemplary method continues with catalytically cracking the pyrolysis oil stream 16 and the hydrocarbon stream 20 in the presence of the particulate cracking catalyst 30. In this regard, the particulate cracking catalyst 30 can first comingle with one of the hydrocarbon stream 20 or the pyrolysis oil stream 16 before mixing the other of the hydrocarbon stream 20 or the pyrolysis oil stream 16. Because the particulate cracking catalyst 30 is generally introduced into the reaction zone 28 at a temperature that is sufficient to facilitate catalytic cracking of the mixture 46 of the pyrolysis oil stream 16 and the hydrocarbon stream 20, catalytic cracking generally commences when the particulate cracking catalyst 30 is comingled with the hydrocarbon stream 20 and/or the pyrolysis oil stream 16.

In an exemplary embodiment and as shown in FIG. 1, the reaction zone 28 of the FCC unit 14 is included in a vertical conduit or riser 24. In an embodiment, catalytically cracking the pyrolysis oil stream 16 and the hydrocarbon stream 20 includes comingling the particulate cracking catalyst 30 and the pyrolysis oil stream 16 and/or the hydrocarbon stream 20 in the reaction zone 28. For example, in an embodiment and as shown in FIG. 1, the pyrolysis oil stream 16 is introduced into the riser 24 from the pyrolysis oil outlet 36 with the pyrolysis oil outlet 36 located upstream of the hydrocarbon outlet 38. In this embodiment, the particulate cracking catalyst 30 may be introduced into the reaction zone 28 at a catalyst outlet 31 that is downstream of the pyrolysis oil outlet 36 but upstream of the hydrocarbon outlet 38, resulting in the particulate cracking catalyst 30 first comingling with the pyrolysis oil stream 16 before introducing the hydrocarbon stream 20 into the reaction zone 28. However, it is to be appreciated that the methods described herein are not particularly limited to the relative locations of the hydrocarbon outlet 38, the catalyst outlet 31, and the pyrolysis oil outlet 36 and that any relative location of the hydrocarbon outlet 38, the catalyst outlet 31, and the pyrolysis oil outlet 36, whether upstream, downstream, or at evenstream from each other, is feasible in accordance with the methods described herein. The residence time of the particulate cracking catalyst 30 and the mixture 46 of the pyrolysis oil stream 16 and the hydrocarbon stream 20 in the riser 24 is generally only a few seconds. General operating conditions for the reaction zone 28 in FCC units are known in the art.

Catalytic cracking of the pyrolysis oil stream 16 and the hydrocarbon stream 20 produces an effluent 59 that includes spent particulate cracking catalyst 76 and a gaseous component 60. The gaseous component 60 includes products from the reaction in the reaction zone 28 such as cracked hydrocarbons, and the cracked hydrocarbons may be condensed to obtain upgraded fuel products that have a range of boiling points. Examples of upgraded fuel products include, but are not limited to, propane, butane, naphtha, light cycle oil, and heavy fuel oil. In accordance with an embodiment of the contemplated method, the spent particulate cracking catalyst 76 and the gaseous component 60 are separated. In this embodiment, and as shown in FIG. 1, the FCC unit 14 further includes a separator vessel 62 that is in fluid communication with the reaction zone 28. The separator vessel 62 separates the spent particulate cracking catalyst 76 from the effluent 59. The separator vessel 62 may include a solids-vapor separation device 64, which is normally located within and at the top of the separator vessel 62. The gaseous component 60 of the effluent 59 is separated from the spent particulate cracking catalyst 76 in the separator vessel 62, and the gaseous component 60 may be vented from the separator vessel 62 via a product line 66. Although not shown, the gaseous component 60 may be compressed to obtain the upgraded fuel products, and FCC product gas that is not condensed may be recycled for use as the carrier gas 52 in embodiments. In an embodiment, the spent particulate cracking catalyst 76 falls downward to a stripper 68 that is located in a lower part of the separator vessel 62. The stripper 68 assists with removing deposited compounds from the spent particulate cracking catalyst 76 prior to further catalyst regeneration.

In an embodiment, the FCC unit 14 further includes a catalyst regenerator 70 that is in fluid communication with the separator vessel 62 and that is also in fluid communication with the reaction zone 28. The spent particulate cracking catalyst 76 that is separated from the gaseous component 60 is introduced into the catalyst regenerator 70 from the stripper 68, and deposited compounds are removed from the spent particulate cracking catalyst 76 in the catalyst regenerator 70 by contacting the spent particulate cracking catalyst 76 with oxygen-containing regeneration gas. In one embodiment, the spent particulate cracking catalyst 76 is transferred to the catalyst regenerator 70 by way of a first transfer line 72 connected between the catalyst regenerator 70 and the stripper 68. Furthermore, the catalyst regenerator 70, being in fluid communication with the reaction zone 28, passes regenerated particulate catalyst 30 to the reaction zone 28. In the FCC unit 14 as illustrated in FIG. 1, the particulate cracking catalyst 30 is continuously circulated from the reaction zone 28 to the catalyst regenerator 70 and then again to the reaction zone 28, such as through a second transfer line 74.

Figure 4:
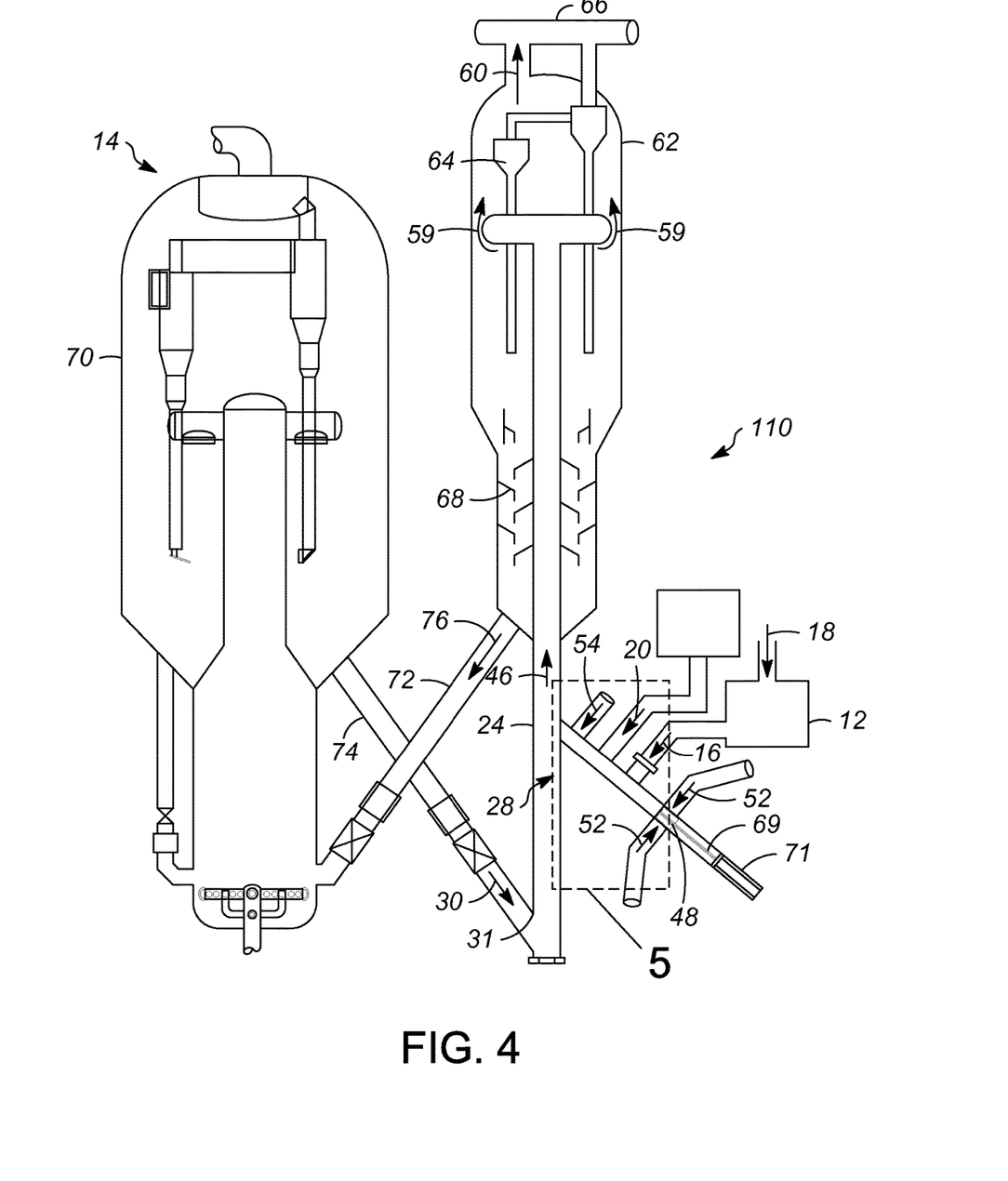
FIG. 4 is a schematic diagram of a fuel processing apparatus and a method for preparing upgraded pyrolysis oil in accordance with another exemplary embodiment.
Figure 5:
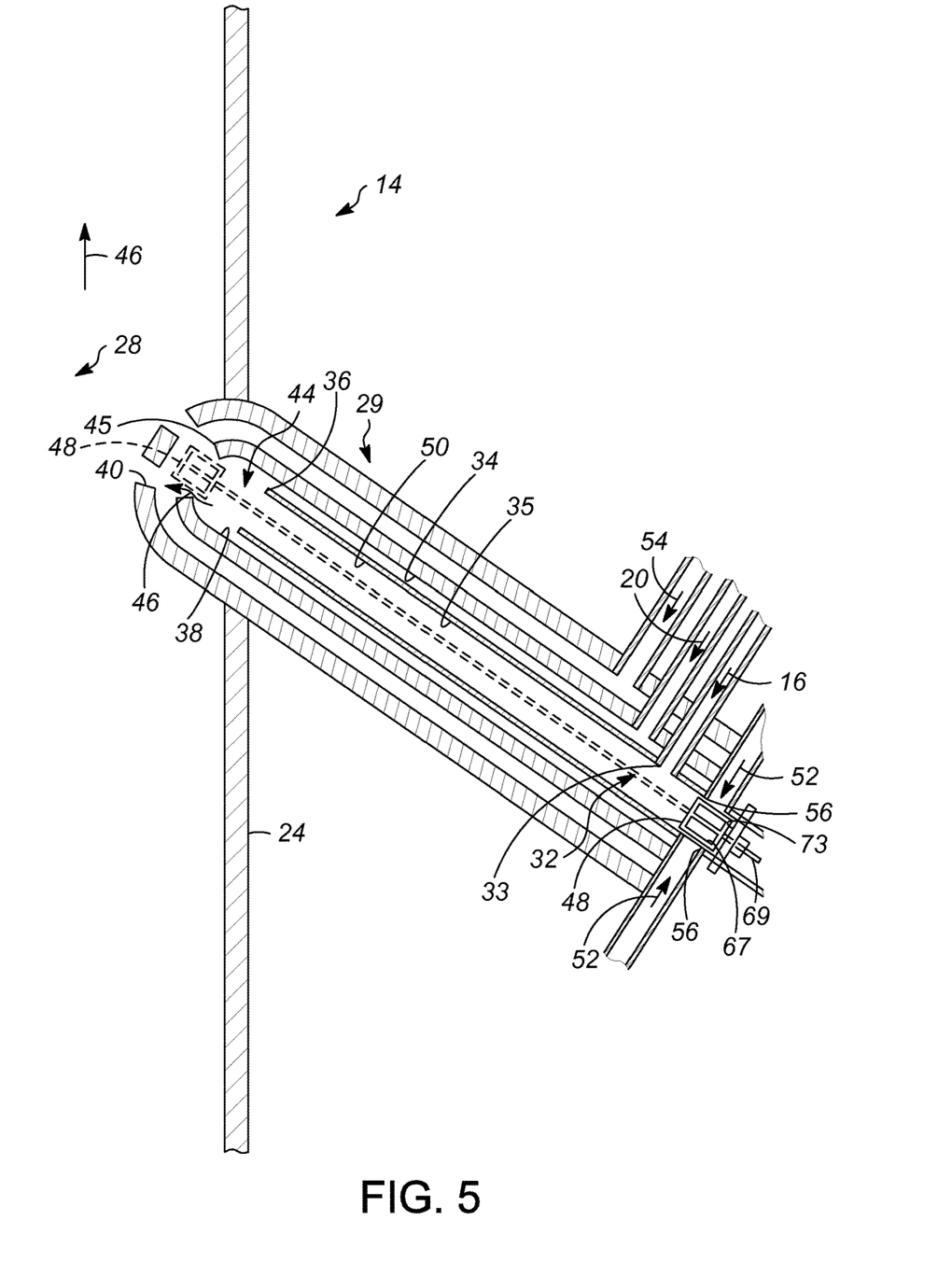
FIG. 5 is a partial schematic view of a portion of the schematic diagram of FIG. 4 showing an embodiment of a pyrolysis oil feed line in greater detail including a cleaning head disposed in the pyrolysis oil feed line for removing pyrolysis oil deposits in the pyrolysis oil feed line.

In another embodiment of a fuel processing apparatus 110 and as shown in FIGS. 4 and 5, the pyrolysis oil stream 16 and the hydrocarbon stream 20 are introduced into the reaction zone 28 by first mixing the pyrolysis oil stream 16 and the hydrocarbon stream 20 in a mixing zone 44 and in the absence of the particulate cracking catalyst 30 prior to introducing the pyrolysis oil stream 16 and the hydrocarbon stream 20 into the reaction zone 28. For example, as shown in FIG. 5, the pyrolysis oil stream 16 is provided through the pyrolysis oil feed line 35 and the hydrocarbon stream 20 is separately provided through the hydrocarbon feed line 34 in a feed distributor 29 that has a mixing zone 44. In this embodiment, the pyrolysis oil outlet 36 and the hydrocarbon outlet 38 are in fluid communication with the mixing zone 44, and the mixture 46 of the pyrolysis oil stream 16 and the hydrocarbon stream 20 that is formed in the mixing zone 44 is then provided through a feed distribution tip 40 into the reaction zone 28. An additional carrier gas 54, which may be the same as the carrier gas 52 described above, may be mixed with the hydrocarbon stream 20 prior to providing the pyrolysis oil stream 16 and the hydrocarbon stream 20 to the mixing zone 44. In this embodiment, the cleaning head 48 as described above is employed in substantially the same manner as described above, and is also disposed in the pyrolysis oil feed line 35. As illustrated in FIG. 5, the cleaning head 48 moves upstream and downstream within the pyrolysis oil feed line 35, and moves beyond the pyrolysis oil outlet 36 of the pyrolysis oil feed line 35 into the mixing zone 44, where the cleaning head 48 also removes pyrolysis oil deposits from a mixing zone outlet 45 that is adjacent to the pyrolysis oil outlet 36.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of upgrading a pyrolysis oil stream and a hydrocarbon stream in a fluid catalytic cracking unit including a reaction zone, the method comprising the steps of:
   generating the pyrolysis oil stream in a fast pyrolysis process and wherein the pyrolysis stream is immiscible with the hydrocarbon stream;
   providing the pyrolysis oil stream, at a temperature less than or equal to about 80° C., through a pyrolysis oil feed line and the hydrocarbon stream through a hydrocarbon feed line separate from the pyrolysis oil feed line, wherein the pyrolysis oil feed line includes a pyrolysis oil outlet and wherein pyrolysis oil deposits form in the pyrolysis oil feed line adjacent the pyrolysis oil outlet;
   introducing the pyrolysis oil stream from the pyrolysis oil feed line and the hydrocarbon stream from the hydrocarbon feed line into the reaction zone;

catalytically cracking the pyrolysis oil stream and the hydrocarbon stream in the presence of a particulate cracking catalyst in the reaction zone; and during catalytic cracking, removing pyrolysis oil deposits in the pyrolysis oil feed line upstream of the reaction zone adjacent the pyrolysis oil outlet with a cleaning head disposed in the pyrolysis oil feed line wherein the cleaning head is a rotating auger, a wire brush head, or a ram head.

2. The method of claim 1, wherein introducing the pyrolysis oil stream and the hydrocarbon stream into the reaction zone comprises separately introducing the pyrolysis oil stream through the pyrolysis oil feed line and the hydrocarbon stream through the hydrocarbon feed line into the reaction zone to form a mixture of the pyrolysis oil stream and the hydrocarbon stream in the reaction zone.

3. The method of claim 1, wherein providing the pyrolysis oil stream through the pyrolysis oil feed line and the hydrocarbon stream through the hydrocarbon feed line comprises providing the hydrocarbon stream separate from the pyrolysis oil stream to a feed distributor having a mixing zone, wherein the pyrolysis oil outlet and the hydrocarbon outlet are in fluid communication with the mixing zone.

4. The method of claim 1, further comprising mixing a carrier gas with the pyrolysis oil stream in an atomizing zone within the pyrolysis oil feed line prior to introducing the pyrolysis oil stream into the reaction zone, and wherein the pyrolysis oil deposits are removed downstream of the atomizing zone in the pyrolysis oil feed line.

5. The method of claim 4, wherein removing the pyrolysis oil deposits in the pyrolysis oil feed line comprises moving the cleaning head within the pyrolysis oil feed line between a position upstream of the atomizing zone in the pyrolysis oil feed line and a position downstream of the atomizing zone in the pyrolysis oil feed line.

6. The method of claim 5, further comprising storing the cleaning head adjacent a carrier gas inlet into the pyrolysis oil feed line.

7. The method of claim 6, wherein the cleaning head comprises openings adapted to allow the carrier gas to pass through when the cleaning head is disposed adjacent the carrier gas inlet.

8. The method of claim 1, wherein removing the pyrolysis oil deposits in the pyrolysis oil feed line comprises moving the cleaning head within the pyrolysis oil feed line in upstream and downstream directions.

9. The method of claim 8, wherein the cleaning head has a shape generally conforming to an inner surface of the pyrolysis oil feed line at the pyrolysis oil outlet, and wherein moving the cleaning head within the pyrolysis oil feed line comprises passing the cleaning head through the pyrolysis oil outlet.

10. The method of claim 1, further comprising mixing a carrier gas with the pyrolysis oil stream in an atomizing zone prior to introducing the pyrolysis oil stream into the reaction zone, and wherein the pyrolysis oil deposits are removed downstream of the atomizing zone.

11. The method of claim 1, wherein providing the pyrolysis oil stream comprises maintaining a temperature of the pyrolysis oil stream below a temperature in the reaction zone substantially up to introduction into the reaction zone.

12. The method of claim 11, wherein maintaining the temperature of the pyrolysis oil stream comprises maintaining the temperature of the pyrolysis oil stream at a temperature of less than or equal to about 100° C. substantially up to introduction into the reaction zone.

* * * * *